United States Patent Office 2,972,778
Patented Feb. 28, 1961

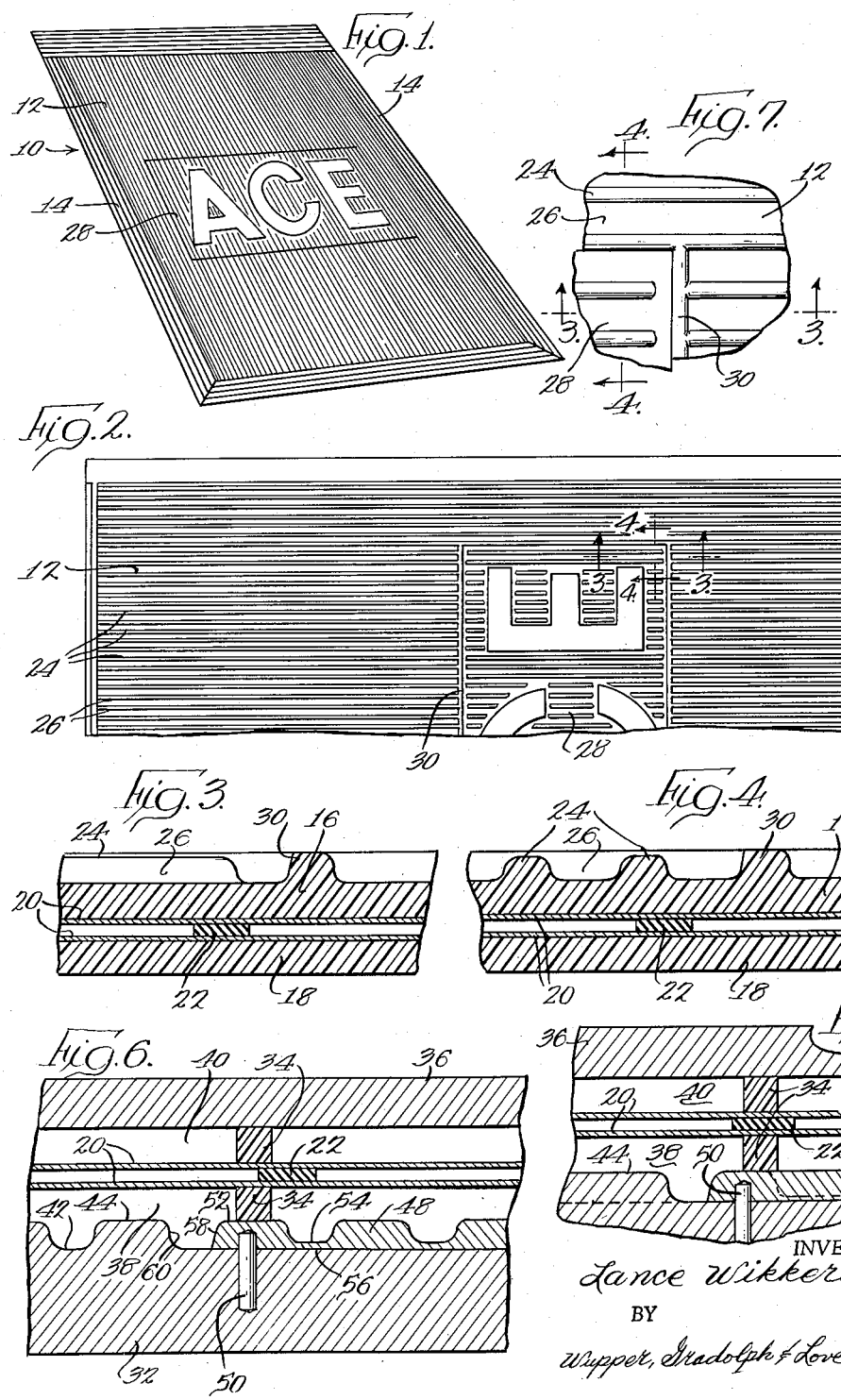

2,972,778
MAT MOLD HAVING A SPECIAL INSERT

Lance Wikkerink, Milwaukee 15, Wis., assignor to George W. Houlsby, Jr., Chicago, Ill.

Filed Sept. 3, 1957, Ser. No. 681,819

4 Claims. (Cl. 18—44)

The present invention relates to mold for molding mat type floor switches having special insets in the visible upper face thereof.

Mat switches of the type produced by this invention are used for controlling the operation of such devices as public building automatic door openers, for instance. They have much the appearance of a pliable floor mat and are usually manufactured of rubber, or preferably some pliable resin, such as one of the polyvinyl resins for instance. In general, they consist of a bottom molded layer which is supported by the floor and a top molded layer separated therefrom excepting at the edges. These two resilient layers enclose a pair of metal sheets (aluminum is satisfactory) spaced slightly apart by a plurality of soft rubber buttons or the like. These two metal plates act as the contacts of an electric switch and are held out of mutual contact until someone steps upon the mat, whereupon the two metal plates are pressed together locally so as to make an electrical contact. This in turn controls the operation of an automatic door actuator so as to cause the actuator to either open or close the door.

The upper surface of such mats is ordinarily corrugated to improve the appearance and to provide channels for any dirt and water that collects upon the surface. It is the purpose of the present invention to provide a mechanism for molding special inset material into this corrugated area as desired by a customer. One of the problems associated with such insets is that, with very few exceptions, one customer will not purchase more than a few mats, and it is therefore not economically feasible to engrave special dies for the entire top surface of a mat in order to accommodate the desire of a customer to have some special trademark, name, design, or message molded into the surface of the mat.

It is therefore the principal object of the present invention to provide a novel arrangement for molding mat-type switches with special insets in the upper surface thereof at comparatively slight additional cost over the basic cost of the mat without such an inset even though only a few such special mats are desired.

An additional object is to provide a die arrangement for molding mat-type floor switches such that a master or principal mold can be provided for the major portion of the top area of the mat with a reentrant cavity portion therein adapted to take any of several comparatively small area special die inserts without the usual precise fit and flash problem encountered when conventional die inserts are used.

Yet another object is to provide an arrangement of the above type in which it is not necessary to have any even approximately close dimensional conformity as between the major portion of the die and the insert to be used therewith.

The product of the invention is a mat-type floor switch having a special inset in the upper surface thereof outlined by a rib surrounding the inset, such rib having a top surface in the p'ane of the rib top surface of the surrounding portion of the mat.

Other objects and advantages will become apparent from the following description of a preferred embodiment of my invention which is illustrated in the accompanying drawings.

In the drawings, in which similar characters of reference refer to similar parts throughout the several views, Figure 1 is a perspective view of a typical mat molded according to the teachings of the present invention and shown as it might appear when in use upon the floor;

Fig. 2 is a larger scale top view of approximately one-half of the mat of Fig. 1 illustrating a typical arrangement of mat corrugations and special design inset;

Fig. 3 is a large scale fractional longitudinal vertical sectional view which may be considered as taken in the direction of the arrows substantially along the line 3—3 of Fig. 2;

Fig. 4 is a large scale fractional transverse vertical sectional view which may be considered as taken in the direction of the arrows substantially along the line 4—4 of Fig. 2;

Fig. 5 is a fractional longitudinal sectional view through the portion of the mold adapted for molding substantially the portion of the mat illustrated in Fig. 3;

Fig. 6 is a longitudinal sectional view through the mold illustrating substantially the portion thereof adapted for molding the portion of the mat illustrated in Fig. 4; and Fig. 7 is a large scale detail taken from Fig. 2 for the purpose of illustrating the juncture in the mat surface between the portions molded by the principal mold element and that portion of the surface molded by the special mold insert. The section lines are repeated on this figure in the interest of clarity.

A typical match switch of the type forming the subject matter of the present invention is illustrated at 10. In general, it consists of a flexible mat 12 formed of a resilient material, such as one of the polyvinyl resins for instance, surrounded by a metal trim strip 14 formed, for instance, of aluminum extrusion, which may be used to anchor the mat against accidental displacement.

As is best seen in Figs. 3 and 4, for instance, the mat has a top layer 16 and a bottom layer 18. These two layers on their contiguous sides are bonded to aluminum sheets 20 which are spaced apart by resilient buttons 22 formed typically of soft rubber. The metal sheets 20 act as switch plates such that whenever anyone steps upon the upper surface 16, plates 20 are pressed together, thereby completing an electric circuit which may be used as desired. In the present instance these mats are used primarily for controlling the operation of automatic swinging doors of the type commonly found at the entrances and exits of public buildings.

The entire upper surface of the mat 12 is ribbed longitudinally as at 24, the depressions between the ribs being indicated by the numeral 26, excepting for a rectangular area 28 recessed into the surface of the mat. This area, it is contemplated, will have some special design as requested by a user of the mat. As shown, the special inset consists of the letters "ACE" surrounded by a continuation of the ribbed design of the main portion of the mat, excepting that the inset is set off the main portion by transversely extending ribs 30 which, together with the longitudinally extending ribs at their ends, enclose or frame the inset.

The arrangement is shown in greater details in Figs. 3, 4, and 7, which are drawn to larger scale than Figs. 1 and 2. In Fig. 7 the inset 28 is shown where it joins the main portion of the mat at the upper right-hand corner of the inset as seen in Fig. 2.

This mat is assembled and molded as is best seen in Figs. 5 and 6, where it will appear that the lower mold element, which is generally used to mold the top face of the mat, is indicated at 32. While the mold is open, blocks of the plastic material of which the mat is formed, are set here and there over the face of the mold as is indicated at 34, and one of the aluminum sheets 20 is placed on top of these blocks. The rubber spacers 22 are then put in place and the second aluminum sheet 20 is laid thereover and the edges of the sheets 20 are sealed together with an insulating material to enclose an air space. If desired, of course, the aluminum sheets 20, together with the spacing elements 22 can be prior assembled and sealed around their edges so that the two sheets and spacers can be handled as a unit. In any event, after the top sheet 20 has been located, another group of plastic spacing elements 34 is placed thereover and the mold closed by locating the top mold element 36. The liquid plastic material, such as a polyvinyl resin, for instance, is injected to fill the spaces 38 and 40 below and above the sheets 20.

Prior to the injection step, the blocks 34 support the sheets 20 in a proper location. During injection of the fluid material into the spaces 38 and 40, the blocks 34 soften somewhat and thereby become incorporated in mass of injected material. They nevertheless retain the appropriate spacing of the elements until the fluid material has cooled. This type of plastic molding is normally conducted at low pressure and is essentially a casting step. After the material has cooled sufficiently, the mold is opened and the article removed.

The lower mold element 32 is fluted on its upper face so that the flutes 42 form the ribs 24, while the mold ribs 44 form the depressions or grooves 26 in the mat upper surface. In Figs. 5 and 6 it will be seen that the rectangular area to take the mold element 48 for the inset 28 is indicated at 46 and is simply a portion of the mold face where the metal has been removed to the depth of the grooves 42 over the complete area of the inset including that of the surrounding ribs. The mold insert 48 may have any desired design in its surface, and for a particular customer or special order, only this small mold insert needs to be specially designed and engraved. When it is inserted, it is appropriately located by pins 50 embedded both in the main mold portion 32 and in the insert 48.

The entire periphery of the insert is surrounded by a ridge 52, the upper surface of which is in the same plane as the upper surface of the ribs 44. This surrounding rib 52 therefore provides a groove in the finished mat, the bottom of which is in the same plane as the bottoms of the surrounding grooves. In order to hold the rib 52 together with the remaining portions of the mold insert, it will be appreciated that the cut outs in the insert, such as the grooves 54 which form ribs in the finished product equivalent to the ribs 24 in the surrounding portion of the mat, will not be quite as deep as the grooves 42. The upper surface, therefore, of the entire area of the inset will be a few thousandths of an inch down below the top surface of the ribs of the surrounding portion of the mat. Since the amount of this depression is only that necessary to supply sufficient metal in the mold insert at 56 to hold the several pieces of the insert together, it will be appreciated that this depressed effect is entirely unnoticeable.

Usually when mold inserts of any kind are used, every attempt is make to make the insert fit the complementary recess in the main portion of the mold as precisely as possible so as to reduce the flash at the juncture between the main portion and the inset portion to a minimum. The present invention, however, contemplates no such attempt and in fact, as will be apparent from Figs. 5 and 6, the periphery of the insert, indicated at 58 is spaced from the surrounding periphery of the recess 46 in the main portion of the mold by an amount which is equivalent to the desired width of the ribs 30, or the equivalent side edge ribs, which surround the insert. The space, therefore, around the entire periphery of the insert fills with the plastic material and becomes the surrounding rib for the inset.

Inspection of Figs. 5 and 6 will show that injection of the plastic molding material does not cause the insert 48 to float away from the main portion of the mold, since the insert is held down by some of the blocks 34 previously mentioned as being used for properly positioning the metal sheets 20. Furthermore, it will be noted that the only place where flash can form at the juncture between the main portion of the mold and the insert, is at the top edge of the inset surrounding rib, and that any flash so formed will extend horizontally inwardly therefrom; that is, so as partially to overlie the periphery of the insert. Since flash is in this location only, and since it extends horizontally from the top edge of the ribs, it is easily removable, at the conclusion of the molding operation, by running a knife or equivalent instrument around the edge of the rib which encloses the insert.

From the above description of a preferred embodiment of my invention, it will be appreciated that variations may be made in the arrangement shown, without departing from the spirit or scope of the invention. As an example, the inset panel 28, as shown in the drawings, is rectangular, but it may be diamond shaped or circular or oval, or any other shape desired. It will be appreciated further that one of the salient features of the invention is that the special insert for the master mold need not be finished to close dimensions at its edges, since any inprecision in this respect results only in a slight variation in the thickness of the rib 30, which is of no consequence. It will be appreciated further that little, if any, flash will result even though the insert fits loosely in the master mold, and that any flash so formed will extend horizontally from the top edge of the rib and is therefore easily removable prior to shipment of the molded article.

Furthermore, since tight fit of the mold elements is not necessary, the mold insert may easily be lifted out and replaced by another having a different design without interrupting the molding operation for more than a few seconds.

Having described my invention in connection with a preferred embodiment thereof, what I claim as new and useful and desire to secure by Letters Patent of the United States is:

1. A mold for forming a resilient mat comprising a mold element having a surface for forming the mat upper face, said surface being design engraved so as to cause the mat upper face to have a relief design formed thereon over the major portion of its area, said mold element surface having a relatively large area surrounded by said design engraved area reentrantly engraved to a uniform depth to form a plane surface at substantially the depth of said design engraving, a mold insert having a plane bottom surface adapted to fit into said relatively large area, said insert being formed to the same general peripheral contour as the periphery of said relatively large area but being appreciably smaller so that when said insert is centered in said relatively large area a portion of said plane depressed area is exposed completely around said insert so as to form a continuous groove of substantial width completely around said insert, said groove being bounded by the peripheral edge of the insert on the inside and the edge of said relatively large area on the outside, means for removably fixing said insert in centered relation in said relatively large area, the thickness of said insert being substantially the same as the depth of said design engraving, said insert having a special design engraved thereon with the depth of said special design engraving being less than the depth of the first said design engraving, and mold means which in conjunction with said mold element and insert forms a mold cavity for forming a mat, whereby the upper face of a mat formed in said mold bears said special design in relief thereon surrounded by a continuous rib surrounded in turn by the first said relief design with the top of said rib substantially flush with the top of the first said design and slightly above the top of the special design.

2. A mold for forming a resilient mat type switch comprising a mold element having a surface for forming the mat upper face, said surface being design engraved so as to cause the mat upper face to have a relief design formed thereon over the major portion of its area, said design including longitudinally extending spaced ribs, said mold element surface having a relatively large area surrounded by said design engraved area reentrantly engraved to a uniform depth to form a plane surface at substantially the depth of said design engraving with said design engraving intersecting said relatively large area, a mold insert having a plane bottom surface adapted to fit into said relatively large area, said insert being formed to the same general peripheral contour as the periphery of said relatively large area but being appreciably smaller so that when said insert is centered in said relatively large area a portion of said plane depressed area is exposed completely around said insert so as to form a continuous groove of substantial width completely around said insert, said groove being bounded by the peripheral edge of the insert on the inside and the edge of said relatively large area on the outside, means for removably fixing said insert in centered relation in said relatively large area, the thickness of said insert being substantially the same as the depth of said design engraving, said insert having a special design engraved thereon with the depth of said special design engraving being less than the depth of the first said design engraving, said special design including ribs in alignment with the first said ribs, and mold means which in conjunction with said mold element and insert forms a mold cavity for forming a mat type switch, whereby the upper face of a mat formed in said mold bears said special design in relief thereon surrounded by a continuous rib surrounded in turn by the first said relief design with the top of said continuous rib substantially flush with the top of and intersecting some of the first said ribs and slightly above the top of the ribs of the special design.

3. A mold for forming a resilient mat comprising a mold element having a surface for forming the mat upper face, said mold element surface having a relatively large continuous area reentrantly engraved to form a plane depressed surface at least partially surrounded by a relief design, a mold insert having a plane bottom surface adapted to fit into said relatively large area, said insert being formed to the same general peripheral contour as the periphery of said relatively large area but being appreciably smaller so that when said insert is located in said relatively large area a portion of said plane depressed area is exposed completely around said insert so as to form a groove of substantial width completely around said insert, said groove being bounded by the peripheral edge of the insert on the inside and the edge of said relatively large area on the outside, means for removably fixing said insert in place in said relatively large area, the thickness of said insert being substantially the same as the depth of said reentrant engraving, said insert having a special design engraved thereon which nowhere extends to the edge thereof, and mold means which in conjunction with said mold element and insert forms a mold cavity for forming a mat, whereby the upper face of a mat formed in said mold bears said special design in relief thereon surrounded by a continuous groove, surrounded by a continuous rib surrounded in turn by the first said relief design.

4. A mold for forming a resilient mat comprising a mold element having a surface for forming the mat upper face, said mold element surface having a relatively large continuous plane depressed surface therein of substantially uniform depth, a mold insert having a plane bottom surface adapted to fit into said relatively large area and against said depressed surface, said insert being formed to the same general peripheral contour as the periphery of said relatively large area but being appreciably smaller so that when said insert is substantially centered in said relatively large area a portion of said plane depressed area is exposed completely around said insert so as to form a continuous groove of substantial width completely around said insert, means for removably fixing said insert in place in substantially centered relation in said relatively large area, the thickness of said insert being substantially the same as the depth to said depressed surface, said insert having a special design engraved thereon surrounded by an unengraved portion, and mold means which in conjunction with said mold element and insert forms a mold cavity for forming a mat such that the upper face of a mat formed in said mold bears said special design in relief thereon surrounded by a continuous groove, surrounded by a continuous rib, and surrounded in turn by the remaining portion of the upper face formed against the first said surface.

References Cited in the file of this patent
UNITED STATES PATENTS

| | | |
|---|---|---|
| 445,785 | Kator | Feb. 3, 1891 |
| 2,449,465 | Flakes | Sept. 14, 1948 |
| 2,807,564 | Mitchell | Sept. 24, 1957 |

FOREIGN PATENTS

| | | |
|---|---|---|
| 793,364 | France | Nov. 16, 1935 |